(12) United States Patent
Nagayama

(10) Patent No.: US 7,205,731 B2
(45) Date of Patent: Apr. 17, 2007

(54) CONTROL OF VEHICLE MOTOR

(75) Inventor: Kazutoshi Nagayama, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 341 days.

(21) Appl. No.: 10/976,860

(22) Filed: Nov. 1, 2004

(65) Prior Publication Data

US 2005/0093494 A1 May 5, 2005

(30) Foreign Application Priority Data

Nov. 4, 2003 (JP) ............................. 2003-374270

(51) Int. Cl.
*H02P 1/54* (2006.01)
*H02P 7/68* (2006.01)

(52) U.S. Cl. .................. 318/139; 318/62; 318/140; 701/22; 180/65.3; 290/9

(58) Field of Classification Search .......... 318/14–146; 290/9; 180/65.3; 701/22
See application file for complete search history.

(56) References Cited

U.S. PATENT DOCUMENTS

| 6,321,145 | B1 * | 11/2001 | Rajashekara | 701/22 |
| 6,481,406 | B2 * | 11/2002 | Pels | 123/179.3 |
| 6,938,713 | B1 * | 9/2005 | Tahara et al. | 180/65.3 |
| 2001/0052760 | A1 * | 12/2001 | Amano et al. | 320/163 |
| 2005/0104544 | A1 * | 5/2005 | Ishikawa | 318/139 |
| 2006/0152180 | A1 * | 7/2006 | Tahara et al. | 318/139 |

FOREIGN PATENT DOCUMENTS

JP 2001-355480 A 12/2001

\* cited by examiner

*Primary Examiner*—Paul Ip
(74) *Attorney, Agent, or Firm*—Foley & Lardner LLP

(57) ABSTRACT

A motor control device for controlling an electric motor (1,6) installed in a vehicle, is disclosed. The motor has a field winding (101,601). The motor control device has a battery (4) charged by power at a first voltage (Vb), an voltage increase/decrease inverter (3) capable of increasing the first voltage from the battery, an excitation control circuit (102, 106) which allows or disallows supply of the exciting current to the field winding (101,601), a sensor (35,41–48) which detects a state of the vehicle, and a controller (8). The controller (8) determines whether or not to start the motor (1,6) based on a signal from the sensor (41–48). When the motor is to be started, the controller (8) allows supply of exciting current by the excitation control circuit (102, 106) and controls the voltage increasing circuit so that the first voltage is increased to a second voltage higher than the first voltage (Vb).

17 Claims, 5 Drawing Sheets

CONTROL OF VEHICLE MOTOR

FIELD OF THE INVENTION

This invention relates to control of a vehicle electric motor.

BACKGROUND OF THE INVENTION

One type of hybrid vehicle performs an idle stop control which automatically stops and starts an engine for the purpose of improving fuel cost-performance performance or exhaust performance. Tokkai 2001-355480 published by the Japanese Patent Office in 2001 discloses such a hybrid vehicle. The hybrid vehicle of the prior art performs an idle stop, when predetermined conditions are satisfied during vehicle stop, and starts the engine automatically by a motor when an idle stop release condition holds.

SUMMARY OF THE INVENTION

However, in this prior art, an electric motor which has a field winding is used to start the engine. For starting the engine, the motor outputs a torque by passing an armature current after sufficient magnetic flux is generated by supplying an exciting current first to the field winding. Therefore, as the required motor torque is not outputted until the magnetic flux is fully developed after the exciting current starts to be supplied, the engine cannot be started immediately even if the idle stop release condition is satisfied. To eliminate the startup time delay, a steady current may be supplied to the field winding even during motor stop, but in this case power consumption will increase.

It is therefore an object of this invention to provide a motor control device which enables a motor to generate a required drive torque with a rapid response to a start request, and thereby prevent an increase in power consumption.

In order to achieve the above object, this invention provides a motor control device for controlling an electric motor installed in a vehicle, the motor having a field winding. The motor control device comprises a battery charged by power at a first voltage and an inverter capable of supplying the power charged in the battery to the motor. The inverter comprises a voltage increasing circuit capable of increasing the first voltage from the battery, an inverter circuit capable of supplying the increased voltage, and a connection part between the voltage increasing circuit and the inverter circuit, wherein the connection part is connected to the field winding to allow passage of an exciting current from the connection part to the field winding. The motor control device further comprises an excitation control circuit which allows or disallows supply of the exciting current to the field winding, a sensor which detects the state of the vehicle, and a controller. The controller controls the inverter to supply power to the motor so as to start the motor. Further, the controller is programmed to: determine whether or not to start the motor based on a signal from the sensor; allow supply of exciting current by the excitation control circuit when the motor is to be started, and control the voltage increasing circuit when the motor is to be started, so that the first voltage is increased to a second voltage higher than the first voltage.

The details as well as other features and advantages of this invention are set forth in the remainder of the specification and are shown in the accompanying drawings.

DESCRIPTION OF THE PREFERRED EMBODIMENTS

Figure 1:
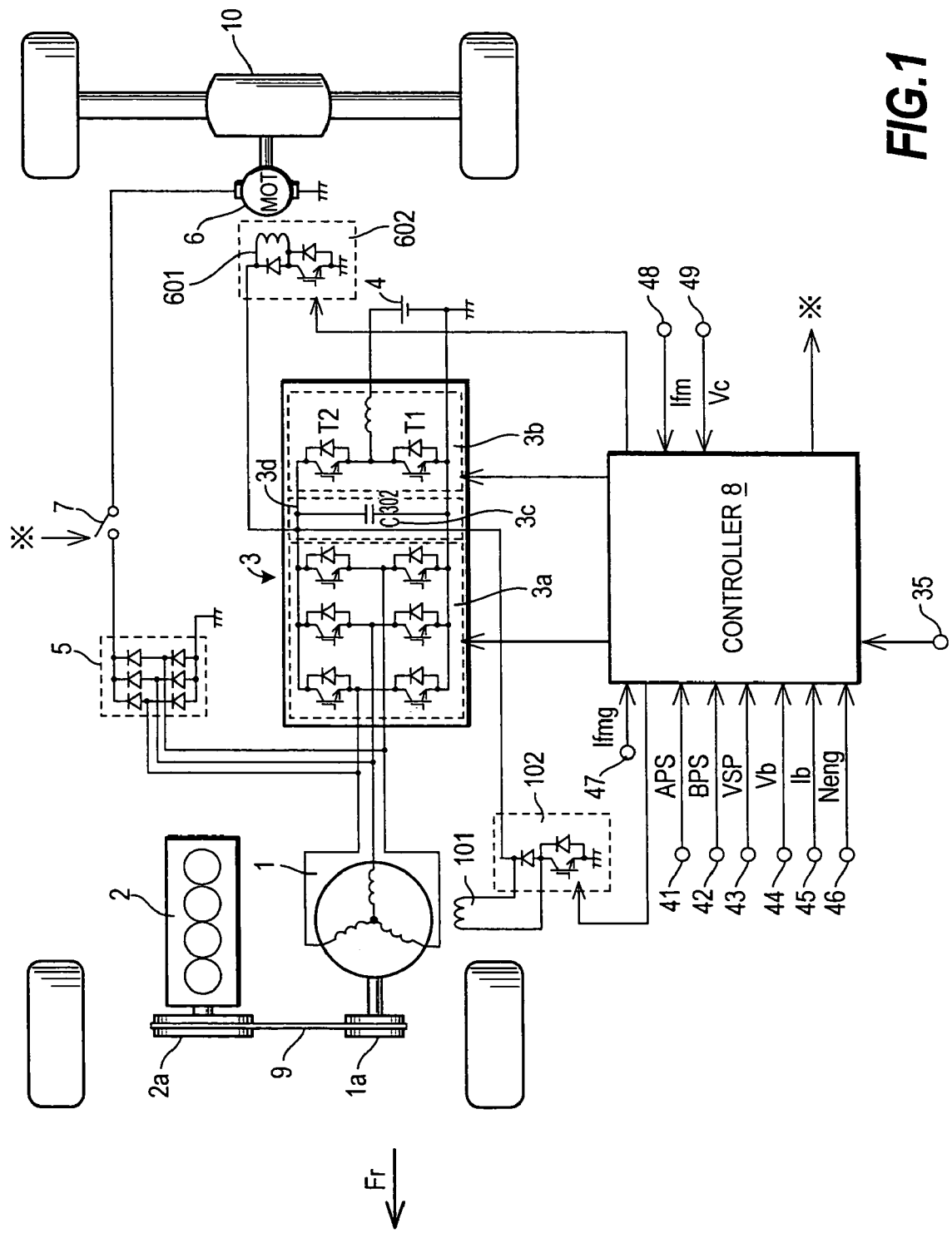
FIG. 1 is a schematic diagram of a hybrid vehicle which uses the motor control device of this embodiment.

Referring to FIG. 1, the construction of a hybrid vehicle using this embodiment will first be described.

The hybrid vehicle has front wheels driven by the output torque from the engine 2, and rear wheels rotated by the output torque from a drive motor 6. The rear wheels are mainly driven during start acceleration and when the front wheels slip. The hybrid vehicle has an idle stop function which stops the engine automatically when predetermined conditions are satisfied (for example, during a traffic signal stop).

The hybrid vehicle has a startup motor 1, engine 2, voltage increase/decrease inverter 3, battery 4, diode circuit 5, drive motor 6, switch 7 and controller 8. The startup motor 1 has a field winding and an armature. The field winding generates magnetic flux (magnetic field) by being supplied with exciting current. An alternating current is supplied to the armature of the startup motor 1 as an armature current. A rotor of the startup motor 1 rotates due to the interaction of the magnetic flux and armature current. The startup motor 1 is an electric motor which cranks the engine 2 to start the engine 2, and in some cases is driven by the engine 2 to generate power.

The startup motor 1 and engine 2 are connected via a belt 9 looped around a belt pulley 1a on the motor shaft of the startup motor 1 and a belt pulley 2a on the crankshaft of the engine 2.

The voltage increase/decrease inverter 3 comprises an inverter circuit 3a, voltage increase/decrease circuit 3b, capacitor 3c, connection part 3d between the voltage increase/decrease circuit 3b and inverter circuit 3a. The voltage increase/decrease circuit 3b is a buck-boost converter capable of functioning as a buck converter or boost converter. The connection part 3d may include a capacitor 3c. The inverter circuit 3a comprises plural switching elements (power transistors) and plural diodes, and supplies an alternating current as the armature current to the startup motor 1 according to a command signal (specifically, an ON/OFF command signal) of a controller 8. A battery 4 is a 12V battery which can supply power to the startup motor 1, and is charged with power generated by the startup motor 1. After the voltage from the battery 4 is increased by the voltage increase/decrease circuit 3b, it is applied to the inverter circuit 3a via the capacitor 3c and connection part 3d. When the startup motor 1 generates power, power is supplied to the battery 4 while the voltage increase/decrease circuit decreases the voltage supplied from the inverter circuit 3a (terminal voltage of capacitor 3c).

The diode circuit 5 is a rectifying circuit which outputs the armature current to the vehicle drive motor 6. The vehicle drive motor 6 is an electric motor which comprises a field winding and an armature. The armature of the vehicle drive motor 6 is supplied with power generated by the startup motor 1 via the diode circuit 5. The vehicle drive motor 6 drives the rear wheels via a differential gear 10. Depending on the case, the power from the battery 4 may be supplied to the armature of the vehicle drive motor 6 via the inverter circuit 3*a*. In this embodiment, although the vehicle drive motor 6 is shown as a direct current (DC) motor, it may be an alternating current (AC) motor provided with an inverter. A switch 7 switches power to the vehicle drive motor 6 OFF or ON.

The controller 8 controls operation of the startup motor 1, vehicle drive motor 6, voltage increase/decrease inverter 3 and switch 7. The controller 8 comprises a microcomputer having a central processing unit (CPU), read-only memory (ROM), random access memory (RAM) and an input/output interface (I/O interface).

The controller 8 receives detection signals indicating an accelerator pedal stroke APS and a brake pedal stroke BPS by the vehicle driver, a vehicle speed VSP, the state of the battery 4 (i.e., voltage Vb and current Ib of the battery) and an engine rotation speed Neng, respectively, from an accelerator pedal stroke sensor 41, brake pedal stroke sensor 42, vehicle speed sensor 43, battery voltage sensor 44, battery current sensor 45 and engine rotation speed sensor 46. Based on these detection signals, the controller 8 selects an idle stop mode, automatic startup mode, 4WD (four-wheel drive) running mode or a charge mode of the battery 4, and performs magnetic field control, voltage increase/decrease control and control of the switch 7 according to the control mode. The controller 8 also receives detection signals indicating an exciting current Ifmg flowing through the field winding 101, an exciting current Ifm flowing through the field winding 601, and a voltage Vc of the capacitor 3*c*, respectively, from a first exciting current sensor 47, a second exciting current sensor 48 and a capacitor voltage sensor 49. The voltage Vc of the capacitor 3*c* is equal to the voltage applied to the connection part 3*d*.

The vehicle drive motor 6 operates in the 4WD running mode. The 4WD running mode may be selected until the vehicle speed reaches a predetermined speed (e.g. 26 km/hour) from startup of the vehicle.

The 4WD running mode may be selected when a slip of the front wheels is detected (e.g., when running on a road surface which is slippery such as a snowy road). In this case, the controller 8 continuously computes the slip value or slip ratio of the front wheels, and when the slip value exceeds a predetermined value, it is determined that the front wheels have slipped. The controller 8 continuously computes the slip value of the front wheels. The slip value is defined as a difference between the front and rear wheel circumferential speeds. For example, the predetermined value is 3 km/hour. The controller 8 can calculate the slip value by using a plural wheel rotation speed sensor 35 which detects front and rear wheel rotation speeds, i.e. front and rear wheel circumferential speeds divided by the radius of a wheel. One of the plural wheel rotation speed sensor 35 may be used as the vehicle speed sensor 43.

Therefore, the wheel rotation speed sensor 35 functions as a sensor which detects a vehicle state (wheel slip state). Based on a signal indicating the state of the vehicle from the wheel rotation speed sensor 35, the controller 8 determines whether or not the vehicle drive motor 6 should start (i.e., whether or not 4WD running is required).

The voltage increase/decrease inverter 3 comprises the inverter circuit 3*a*, voltage increase/decrease circuit 3*b*, capacitor 3*c* and connection part 3*d* as stated above. Power is supplied from the battery 4 to the startup motor 1, and in some cases, power is supplied from the startup motor 1 to the battery 4 to regenerate it. Power is supplied from the voltage increase/decrease circuit 3*b* to the field windings 101 and 601 of the startup motor 1 and vehicle drive motor 6 via the connection part 3*d*.

In the voltage increase mode, the controller 8 switches a switching element T1 (power transistor) of the voltage increase/decrease circuit 3*b* ON and OFF to vary a duty factor.

In this way, the voltage increase/decrease circuit 3*b* increases the terminal voltage Vc of the capacitor 3*c* above than 12V, and power is supplied to the field winding 101 and armature winding of the startup motor 1, and the field winding 601 of the vehicle drive motor 6 at a voltage above 12V.

On the other hand, when the charge amount of the battery 4 runs short, the voltage increase/decrease circuit 3*b* changes to the voltage decrease mode. In the voltage decrease mode, the controller 8 switches the switching element T2 of the voltage increase/decrease circuit 3*b* ON or OFF, and varies the duty factor. Hence, to charge the battery with the power generated by the startup motor, the voltage increase/decrease circuit 3*b* decreases the power generation voltage of the startup motor 1 and supplies power to the battery 4.

The controller 8 controls the exciting current supplied to the field winding 101 of the startup motor 1 from the connection part 3*d* of the voltage increase/decrease inverter 3 by switching an excitation control circuit 102 (specifically, a switching element of the excitation control circuit 102), ON and OFF. The controller 8 controls the exciting current supplied to the field winding 601 of the vehicle drive motor 6 from the connection part 3*d* of the voltage increase/decrease inverter 3 by switching an excitation control circuit 602 (specifically, a switching element of the excitation control circuit 602), ON and OFF. When the excitation control circuit switches ON, exciting current can be supplied, and when the excitation control circuit switches OFF, exciting current cannot be supplied.

In the startup motor 1 and the vehicle drive motor 6 with field windings, the motor torque is determined based on the product of the magnetic flux generated by the field winding, and the armature current which is orthogonal to the magnetic flux. Therefore, to generate torque from the motor stop state wherein exciting current is not flowing, exciting current must first be supplied to the field winding to generate the magnetic flux of the field winding.

As shown by the following equation (1), an exciting current Ife flows with a first order delay relative to the voltage of the power supply connected to the field winding. The magnetic flux $\phi$ due to the exciting current Ife, as shown in the following equation (2), is proportional to the exciting current Ife.

$$Ife = V/(R + sL) \qquad (1)$$

Here, R is the electrical resistance of the field winding and L is the inductance (sL: inductance after performing a Laplace transformation) of the field winding.

$$\phi \propto Ife \qquad (2)$$

The exciting current Ife increases with a time constant. $T(=L/R)$ determined by the inductance L and the resistance R of the field winding.

Therefore, if the exciting current is increased up to Vb/R using the battery 4 with voltage Vb, the time taken (appearance time) for the exciting current Ife to increase from zero to Vb/R, is uniquely determined. A larger value of the inductance L of the field winding gives a longer appearance time, so the time required for the motor to generate torque is longer. A long appearance time gives an uncomfortable feeling to the driver.

To shorten the appearance time, the exciting current Ife can continue to be passed during motor stop. However, losses will always occur and efficiency will fall. Therefore, in this embodiment, control is performed to reduce the appearance time of the exciting current and generate motor torque promptly.

Figure 2:
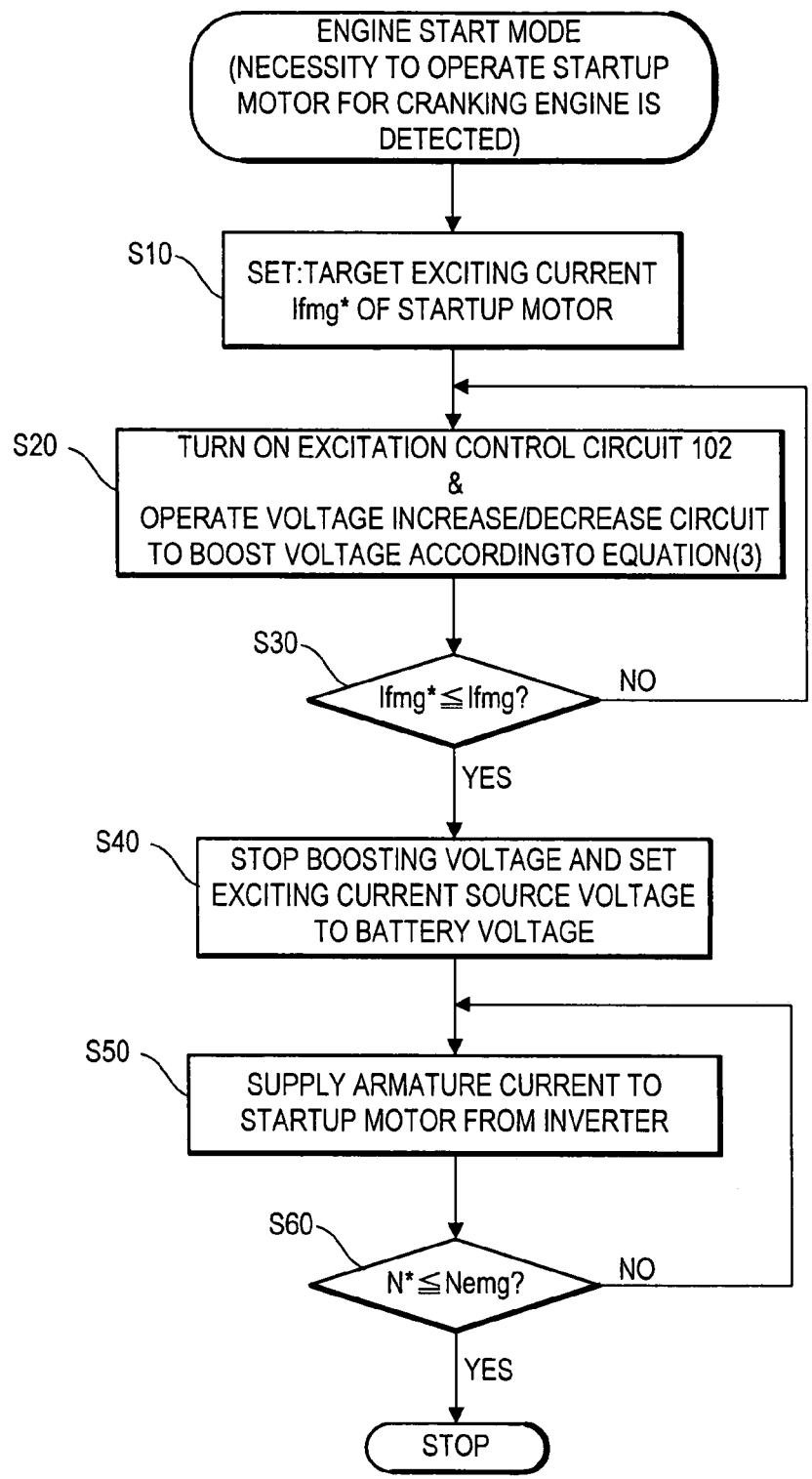
FIG. 2 is a flowchart showing a control routine performed at engine start.

First, referring to FIG. 2, the control of the startup motor 1 will be described. The flowchart of FIG. 2 shows the control routine of the engine startup mode. The controller 8 performs this control routine. In an idle stop state, when an idle stop release condition is satisfied, the controller 8 changes over to an engine startup mode which starts the engine 2 automatically.

For example, when waiting for a traffic signal change (from red to blue), the idle stop conditions which stop the engine automatically are satisfied, and the engine 2 stops. The idle stop conditions are when all of the following conditions hold:
(a) the vehicle speed detected by the vehicle speed sensor 43 is less than a predetermined vehicle speed;
(b) the accelerator pedal stroke detected by the accelerator pedal stroke sensor 41 is less than a predetermined amount;
(c) the brake pedal stroke detected by the brake pedal stroke sensor 42 is more than a predetermined amount; and
(d) The charge amount of the battery 4 computed based on the voltage and current of the battery 4 detected by a battery voltage sensor 44 and battery voltage sensor 45 is more than a predetermined charge amount.

The idle stop release condition which automatically starts the engine 2 from the idle stop state, is when any of the following conditions holds:
(a) the vehicle speed is more than a predetermined vehicle speed;
(b) the accelerator pedal stroke is more than a predetermined amount;
(c) the brake pedal stroke is less than a predetermined amount; and
(d) the charge amount of the battery 4 is less than a predetermined charge amount.

Therefore, the accelerator pedal stroke sensor 41, brake pedal stroke sensor 42, vehicle speed sensor 43, battery voltage sensor 44 and battery voltage sensor 45 function as sensors for detecting the vehicle state, and the controller 8 determines whether or not it is required to start the startup motor (whether or not idle stop release is required), based on a signal indicative of the vehicle state from at least one of these sensors.

In a step S10, a target exciting current Ifmg* supplied to the startup motor 1 is set to Vb/Rfmg (Ifmg*=Vb/Rfmg). Herein, Vb is the maximum battery voltage of 12V, and Rfmg is the field winding resistance of the startup motor 1. Vb/Rfmg is the exciting current which flows when the voltage of the power supply supplying the exciting current is the battery voltage.

Next, in a step S20, the voltage increase operation of the voltage increase/decrease circuit 3b of the voltage increase/decrease inverter 3 is performed to boost voltage from the battery 4 at the same time as the excitation control circuit 102 is switched ON. ON/OFF of the switching element T1 is controlled according to the following equation (3) so that the terminal voltage Vc of the capacitor 3c is a first predetermined voltage E1 (wherein, E1>Vb) which is set based on the required appearance time:

$$E1 = Vb \times (\_sw1/t\_off1) \tag{3}$$

Herein, t_sw1 is the switching cycle of the switching element T1, and t_off1 is the off time of the switching element T1.

Next, in a step S30, a determination as to whether or not the real exciting current Ifmg detected by the first exciting current sensor 47 has reached the target exciting current Ifmg* (=Vb/Rfmg), is performed. When the target exciting current Ifmg* is larger than the real exciting current Ifmg, the routine returns to the step S20. When the target exciting current Ifmg* is smaller than the real exciting current Ifmg, the routine proceeds to a step S40.

In the step S40, voltage increase control of the increase/decrease circuit 3b is suspended to stop boosting voltage from the battery 4, and the power source voltage of the exciting current is the voltage Vb of the battery 4. Since the excitation control circuit 102 is ON at this time, the real exciting current Ifmg is Vb/Rfmg.

Next, in a step S50, based on the engine startup torque, the inverter circuit 3a of the voltage increase/decrease inverter 3 operates, and an armature current (alternating current) is supplied to the armature winding of the startup motor 1. Thus, the startup motor 1 generates torque for startup the engine and starts the engine 2.

Next, in a step S60, a determination as to whether or not the engine rotation speed Neng has reached a target rotation speed N*, is performed. When it has not reached the target speed, the routine returns to the step S50, and when it has reached the target speed, the control routine of the engine startup mode terminates.

As mentioned above, since the voltage increase/decrease circuit 3b is used during engine startup to increase the field voltage, the magnetic flux appearance time is reduced, and the time until the torque required for the startup motor 1 (i.e., engine startup torque) is generated, is reduced. Hence, the uncomfortable feeling imparted to the driver by the startup delay, can be suppressed.

Figure 4:
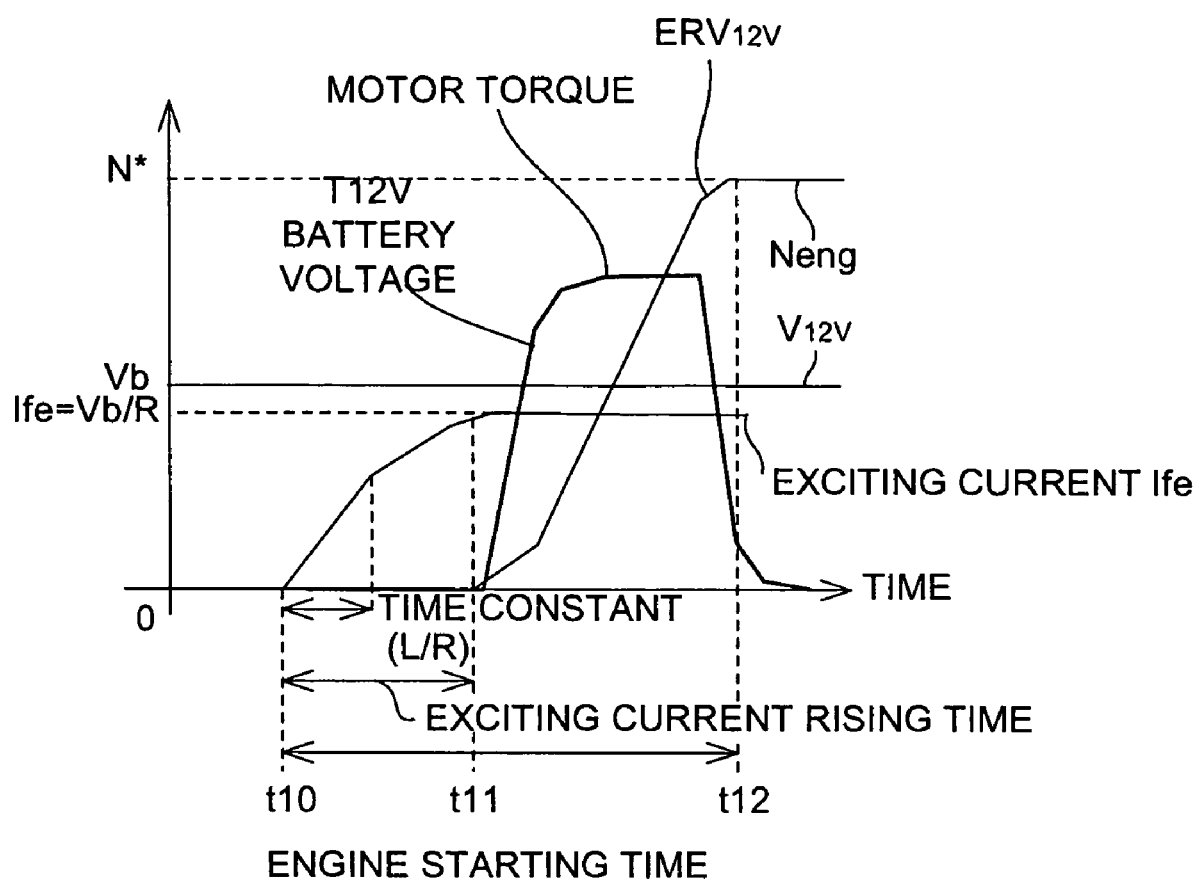
FIG. 4 is a time chart when an engine startup motor is driven only by a battery voltage.
Figure 5:
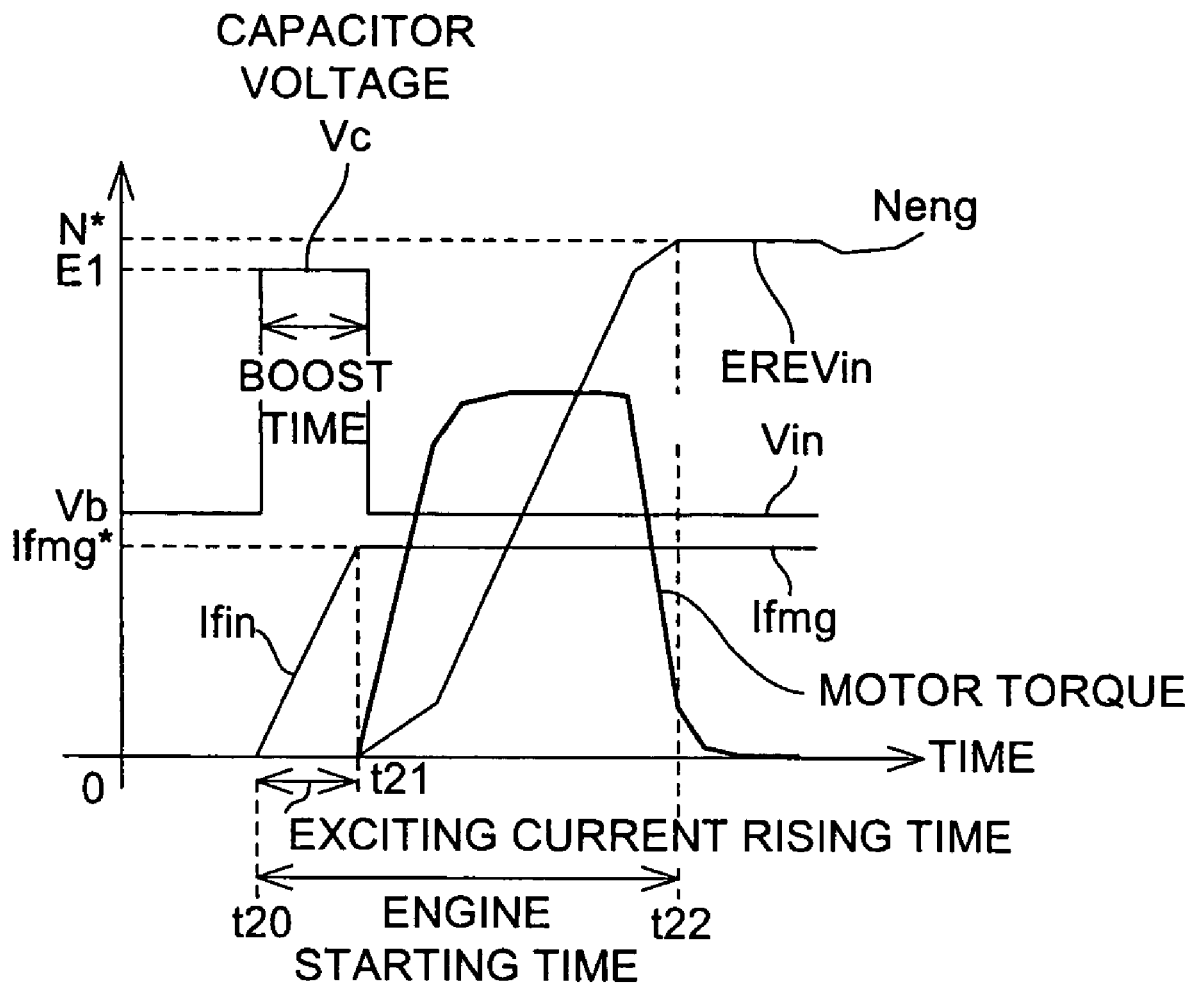
FIG. 5 is a time chart when the engine startup motor is driven using a voltage increase/decrease inverter.

Referring to FIG. 4 and FIG. 5, the difference between the case where the voltage increase/decrease inverter 3 is used, and the case where the voltage increase/decrease inverter 3 is not used, will now be described. The graphs of FIG. 4 and FIG. 5 show the variations of exciting current, motor torque, and engine rotation speed with time. FIG. 4 shows the case where the voltage increase/decrease circuit is not used, and FIG. 5 shows the case where the voltage increase/decrease circuit is used.

In FIG. 4, when idle stop is released at a time t10, the exciting current Ife starts to increase to drive the startup motor 1. As the voltage is constant (solid line V12v in FIG. 4) at the battery voltage Vb, the exciting current Ife rises with a slope determined by the time constant L/R (L=inductance, R=field winding resistance) as mentioned above.

When the exciting current Ife becomes effectively equal to Vb/R at a time t11, the startup motor 1 can generate torque. At a time t12, the engine 2 driven by the startup motor 1 reaches a target rotation speed N*.

In FIG. 5, when idle stop is released at t20, the voltage increase/decrease circuit 3b of the voltage increase/decrease inverter 3 starts to increase voltage. The terminal voltage Vc of the capacitor 3c increases from the battery voltage Vb to the first predetermined voltage E1 (solid line Vin in FIG. 5). Thus, the exciting current Ifmg (or Ife) rises rapidly compared with the case where the voltage Vb (maximum voltage of the battery) is maintained. The exciting current Ifmg reaches the target exciting current Ifmg* at t21 (solid line Ifm in FIG. 5). Therefore, the startup motor generates torque to drive the engine 2 at t21, and the engine rotation reaches the target engine rotation N* at t22 (solid line EREVin in FIG. 5).

The engine startup time t20–t22 in FIG. 5 is shorter than the engine startup time t10–t12 in FIG. 4. In other words, by using a voltage increase circuit to increase the voltage to start the engine as in this embodiment, the time until the engine 2 starts can be reduced.

Next, referring to FIG. 3, the control of the vehicle drive motor 6 which drives the rear wheels will be described. The flowchart of FIG. 3 shows the control routine performed by the controller 8 in a 4WD running-mode.

The vehicle drive motor 6 is driven in the 4WD running mode. If the torque of the vehicle drive motor 6 does not rise promptly when there is a change-over from the 2WD running mode to the 4WD running mode, there will be a time lag between occurrence of the front wheel slip and rotation of the rear wheels, and the driver will have an uncomfortable feeling.

Figure 3:
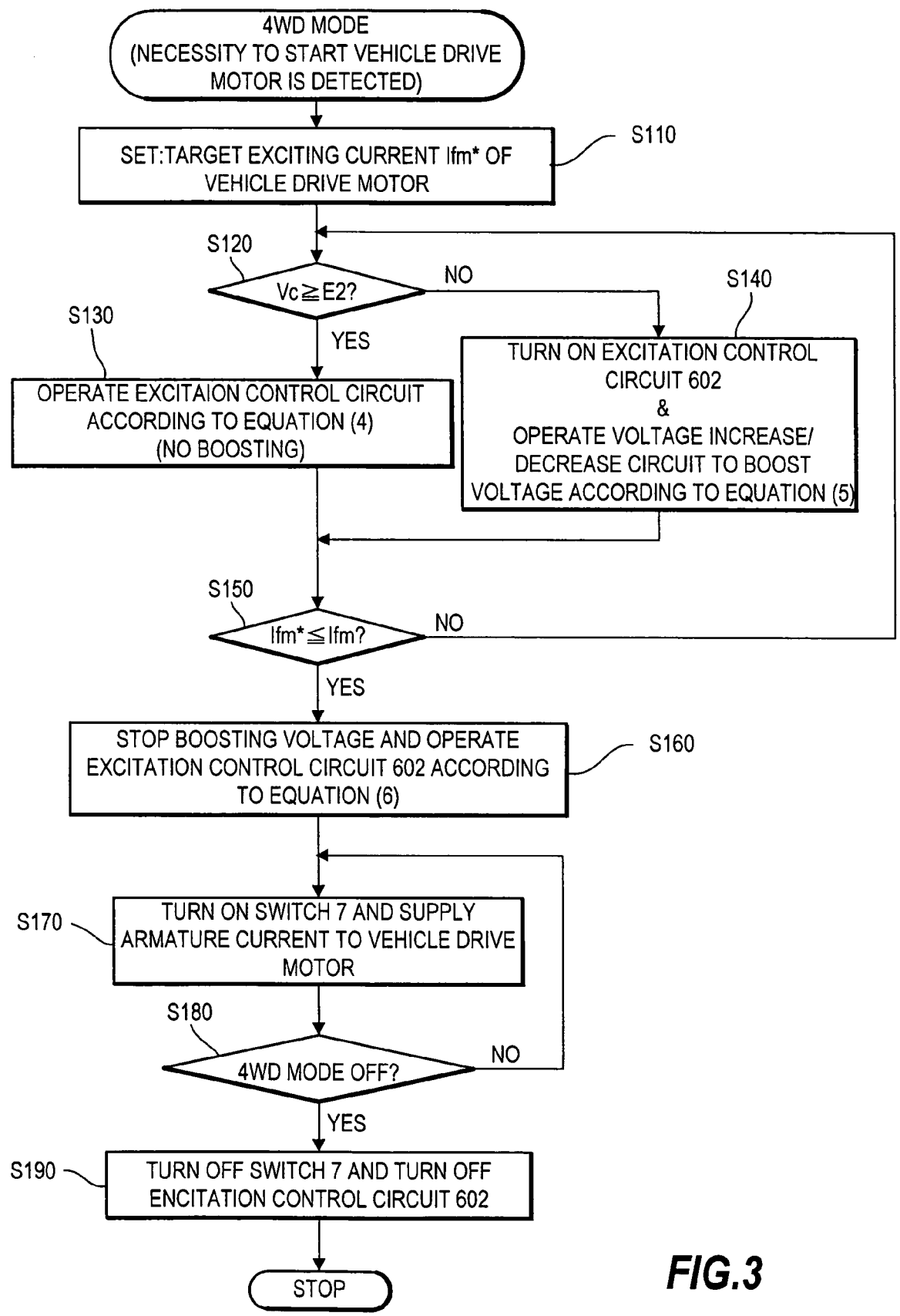
FIG. 3 is a flowchart showing a control routine performed in a 4WD running mode.

Therefore, when changing over from the 2WD running mode to the 4WD running mode, the control shown in the flowchart of FIG. 3 is performed so that the rear wheels generate torque promptly.

In a step S110, the target exciting current Ifm* supplied to the vehicle drive motor 6 is set to Vb/Rfm.

Next, in a step S120, it is determined whether or not the terminal voltage Vc of the capacitor 3c is more than a second predetermined voltage E2. The second predetermined voltage E2 is set based on the exciting current appearance time required, and the second predetermined voltage E2 is larger than Vb (E2>Vb). Herein, as the power generation voltage of the startup motor 1 is applied to the terminals of the capacitor 3c because of the engine running, the terminal voltage Vc of the capacitor 3c is larger than the battery voltage.

If the terminal voltage Vc is more than the second predetermined voltage E2 (Vc≧E2), the routine proceeds to a step S130. Herein, the voltage increase/decrease circuit 3b is in a non-operating state (switching of the switching element is not performed). To make the average voltage applied to the field winding 601 equal to the second predetermined voltage E2, ON/OFF of the excitation control circuit 602 is controlled with the ON time shown by the following equation (4). Subsequently, the routine proceeds to a step S150.

$$t\_on2=(E2/Vc) \times t\_sw2 \quad (4)$$

Herein, t_on2 is the ON time of the excitation control circuit 602, and t_sw2 is the switching cycle of the excitation control circuit 602.

On the other hand, if the terminal voltage Vc is less than the second predetermined voltage E2 (Vc<E2), the routine proceeds to a step S140. Here, the excitation control circuit 602 is switched ON and kept ON, and the voltage increase/decrease circuit 3b starts a voltage increase operation to boost voltage from the battery 3. To make the terminal voltage of the capacitor 3c equal to the second predetermined voltage E2, ON/OFF of the switching element T1 is controlled with the ON time shown by the following equation (5).

Hence, the average voltage applied to the field winding 601 is also the second predetermined voltage E2. Subsequently, the routine proceeds to a step S150.

$$t\_on1=t\_sw1 \times (E2-Vc)/E2 (E2 \neq 0) \quad (5)$$

Herein, t_on1 is the ON time of the switching element T1.

Next, in the step S150, it is determined whether or not the real exciting current Ifm increased to the target exciting current Ifm*. If Ifm*>Ifm, the routine returns to the step S120, and if Ifm*≦Ifm, the routine proceeds to a step S160.

Next, in the step S160, if the voltage increase/decrease circuit 3b is performing a voltage increase operation, the operation of the voltage increase/decrease circuit 3b is stopped. The excitation control circuit 602 is operated according to the following equation (6), the exciting current is fixed at Ifm*, and the routine proceeds to a step S170.

$$t\_on2=(Vb/Vc) \times t\_sw2 \quad (6)$$

Next, in the step S170, the switch 7 is switched ON and the generated power of the startup motor 1 is supplied to the armature winding of the vehicle drive motor 6. The vehicle drive motor 6 generates motor torque and drives the rear wheels.

Next, in a step S180, it is determined whether or not to terminate the 4WD running mode. For example, when the vehicle speed has reached a predetermined speed after the vehicle starts accelerating, or when the slip value falls below the predetermined value, the 4WD running is terminated.

If in the step 180, it is determined that the 4WD running mode should not be terminated, the routine returns to the step S170. If it is determined that the 4WD running mode should be terminated, the routine proceeds to a step S190. Here, the switch 7 and excitation control circuit 602 are switched OFF, and the 4WD running mode terminates.

In the 4WD running mode, when the generated voltage of the startup motor 1 is small, due to the voltage increase of the voltage increase circuit 3b, the terminal voltage of the capacitor 3c becomes the second predetermined voltage E2 which is determined based on the desired exciting current appearance time. When the generated voltage of the startup motor 1 is large, the voltage increase/decrease circuit 3b is maintained in the stop state, and the average voltage applied to the field winding 601 is set to the second predetermined voltage E2 by controlling the operation of the excitation control circuit 602. In both cases, the exciting current passed to the vehicle drive motor 6 increases promptly, so the time until the drive motor 6 generates drive torque can be reduced.

According to this invention, the voltage applied to the field winding of the motor by the voltage increase/decrease inverter is increased.

Therefore, the appearance of the magnetic flux of the motor occurs at an earlier time, and the time taken for the motor to output a predetermined drive torque can thereby be reduced. Since permanent current is not supplied during motor stop, an increase in power consumption is prevented.

The entire contents of Japanese Patent Application P2003-374270 (filed Nov. 4, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A motor control device for controlling an electric motor installed in a vehicle, the motor having a field winding, the motor control device comprising:

a battery charged by power at a first voltage, an inverter capable of supplying the power charged in the battery to the motor, the inverter comprising a voltage increasing circuit capable of increasing the first voltage from the battery, an inverter circuit capable of supplying the increased voltage, and a connection part between the voltage increasing circuit and the inverter circuit, wherein the connection part is connected to the field winding to allow passage of an exciting current from the connection part to the field winding, an excitation control circuit which allows or disallows supply of the exciting current to the field winding, a sensor which detects the state of the vehicle, and a controller which controls the inverter to supply power to the motor so as to start the motor, wherein the controller is programmed to:

determine whether or not to start the motor based on a signal from the sensor, when the motor is to be started, allow supply of exciting current by the excitation control circuit and control the voltage increasing circuit so that the first voltage is increased to a second voltage higher than the first voltage.

2. The motor control device as defined in claim 1, wherein the controller is programmed to:

set a target exciting current, and maintain the second voltage until the exciting current supplied to the field winding reaches the target exciting current.

3. The motor control device as defined in claim 1, wherein the target exciting current is substantially a value obtained by dividing the first voltage of the battery by the electrical resistance of the field winding.

4. The motor control device as defined in claim 1, wherein the vehicle has an engine which is started by the motor, and has a function for automatically stopping the engine according to a vehicle running condition, and the controller is further programmed to determine whether or not to start the motor in a stop state of the engine, based on the state of the vehicle.

5. The motor control device as defined in claim 1, wherein the vehicle has front wheels and rear wheels, and the motor is a vehicle drive motor which drives one of the front wheels and rear wheels.

6. The motor control device as defined in claim 5, wherein the vehicle is a hybrid vehicle having an engine, the vehicle front wheels are driven by the engine and the vehicle rear wheels are driven by the motor.

7. The motor control device as defined in claim 5, further comprising a sensor which detects a vehicle speed, and wherein the controller is further programmed to:

after determining to start the motor, command the excitation control circuit to allow supply of exciting current until the vehicle speed reaches a predetermined vehicle speed.

8. The motor control device as defined in claim 5, wherein the controller is further programmed to:

continuously compute a slip value of a wheel which the motor does not drive based on the signal from the sensor, and determine to start the motor when the slip value exceeds a predetermined value.

9. The motor control device as defined in claim 5, wherein the vehicle further comprises a startup motor connected to the engine which starts the engine.

10. The motor control device as defined in claim 9, wherein the startup motor generates power by being rotated by the engine, and an armature current of the vehicle drive motor is supplied by the startup motor.

11. The motor control device as defined in claim 9, wherein the startup motor has a second field winding, and the connection part of the inverter is connected to the second field winding so that a second exciting current can be passed from the voltage increasing circuit to the second field winding.

12. The motor control device as defined in claim 9, wherein the startup motor generates power by being rotated by the engine, and the startup motor supplies the generated power to the field winding of the vehicle drive motor via the inverter.

13. The motor control device as defined in claim 12, comprising a sensor which detects a voltage generated at the connection part between the voltage increasing circuit and the inverter circuit, and the controller is further programmed to:

compare the voltage generated at the connection part when the startup motor generates power with a predetermined voltage, and when the voltage generated at the connection part is less than the predetermined voltage, control the voltage increasing circuit to increase the voltage from the battery.

14. The motor control device as defined in claim 9, wherein the inverter comprises a voltage decreasing circuit connected the battery, and the controller is further programmed to:

charge the battery with the power generated by the startup motor, by controlling the voltage decreasing circuit to decrease a voltage outputted from the startup motor to the voltage decreasing circuit via the inverter circuit.

15. The motor control device as defined in claim 1, wherein the inverter supplies the armature current to drive the motor according to a command signal from the controller.

16. A motor control method for controlling an electric motor installed in a vehicle, the motor having a field winding, the vehicle including: a battery charged by power at a first voltage, an inverter capable of supplying the power charged in the battery to the motor, the inverter comprising a voltage increasing circuit capable of increasing the first voltage from the battery, an inverter circuit capable of supplying the increased voltage, and a connection part between the voltage increasing circuit and the inverter circuit, wherein the connection part is connected to the field winding to allow passage of an exciting current from the connection part to the field winding, an excitation control circuit which allows or disallows supply of the exciting current to the field winding, the motor control method comprising:

detecting a state of the vehicle, determining whether or not to start the motor based on the state of the vehicle, allowing supply of exciting current by the excitation control circuit when the motor is to be started, and controlling the voltage increasing circuit when the motor is to be started, so that the first voltage is increased to a second voltage higher than the first voltage.

17. A motor control device for controlling an electric motor installed in a vehicle, the motor having a field winding, the motor control device comprising:

a battery charged by power at a first voltage, an inverter capable of supplying the power charged in the battery to the motor, the inverter comprising a voltage increasing circuit capable of increasing the first voltage from the battery, an inverter circuit capable of supplying the increased voltage, and a connection part between the voltage increasing circuit and the inverter circuit, wherein the connection part is connected to the field winding to allow passage of an exciting current from the connection part to the field winding, an excitation control circuit which allows or disallows supply of the exciting current to the field winding, means for detecting a state of the vehicle, means for determining whether or not to start the motor based on the state of the vehicle, means for allowing supply of exciting current by the excitation control circuit when the motor is to be started, and means for controlling the voltage increasing circuit when the motor is to be started, so that the first voltage is increased to a second voltage higher than the first voltage.

* * * * *